United States Patent
Rankin, Jr. et al.

[11] Patent Number: 6,032,337
[45] Date of Patent: Mar. 7, 2000

[54] SPRING LOADED BELT CLIP ASSEMBLY FOR A COMMUNICATION DEVICE

[75] Inventors: John D. Rankin, Jr., Ft. Lauderdale; Garry R. Ardizzone, Jr., Coconut Creek; Bassam Abi Faraj, Coral Springs, all of Fla.

[73] Assignee: Motorola, Inc., Schaumburg, Ill.

[21] Appl. No.: 09/038,917

[22] Filed: Mar. 2, 1998

[51] Int. Cl.[7] .................................................... A45F 5/02
[52] U.S. Cl. .............................................. 24/3.12; 24/3.1
[58] Field of Search .................................. 24/3.1, 3.7, 3.8, 24/3.9, 3.11, 3.12; 248/316.2, 316.4; 224/666, 668, 669, 673, 269; 455/351

[56] References Cited

U.S. PATENT DOCUMENTS

| | | |
|---|---|---|
| 3,623,189 | 11/1971 | Wilcznski . |
| 3,808,642 | 5/1974 | Nation . |
| 4,635,836 | 1/1987 | Mooney et al. . |
| 4,741,074 | 5/1988 | Budano, II et al. . |
| 5,008,988 | 4/1991 | Kuhl et al. . |
| 5,356,060 | 10/1994 | Kuroda ................................ 224/269 X |
| 5,613,236 | 3/1997 | Tajima et al. ............................ 455/351 |
| 5,730,348 | 3/1998 | Tien ..................................... 24/3.12 X |

*Primary Examiner*—James R. Brittain
*Attorney, Agent, or Firm*—Scott M. Garrett

[57] ABSTRACT

A belt clip assembly (100) attaches to a communication device (103) to be worn by a user. The belt clip assembly (100) includes an attachment base (104) and a spring loaded cantilever slide (106). The attachment base (104) includes a bracket (116) having first (123) and second (124) opposed retaining ends integrally connected to a slim strip (122). The first opposed retaining end has a hook (123) and the second opposed retaining end has a receptacle (128) for receiving the spring loaded cantilever slide (106). The cantilever slide (106) is comprised of a fulcrum (108) that has a pair of teeth (110) integrally attached to the fulcrum (108) for forming a protruding cover (111) for the receptacle and slidably positioned on top of the slide casing wall (112). The fulcrum (108) supported teeth (110) attaches to a communication device housing (101) via a pair of receiving slots (120) while the hook end (123) of the bracket wraps around the other end of the housing.

9 Claims, 5 Drawing Sheets

SPRING LOADED BELT CLIP ASSEMBLY FOR A COMMUNICATION DEVICE

FIELD OF THE INVENTION

This invention relates in general to belt clips and more particularly to assemblies for fastening a communication device to a user's body.

BACKGROUND OF THE INVENTION

A communication holster with a belt clip allows a user to transport a communication device without having to hand carry them or to carry them within a pocket, a backpack, a purse, a briefcase or some other types of accessories. Often a woman's attire may not have a pocket available to hold the communication device. Hence, communication device holsters with belt clips are used to attach a communication device such as a cellular telephone, a pager, or a two-way radio equipment to a user's belt or other piece of clothing.

The holsters are often contoured to the bottom portion of the communication device's shape to form a "pocket" for secured attachment of the device in the holster in order to prevent accidental disengagement of the device from the holster. The belt clip, in turn, secures the holster to the user's body. However, the size of the holster tends to make it uncomfortable for the user to wear, aside from the aesthetic unsightliness of a bulky holster hanging from a user's clothing.

At the same time, a proper force balance has to be maintained in the belt clip attachment and detachment mechanism. The attachment mechanism of the communication device to the belt clip needs to be strong enough to hold the device in place, yet reliable enough for the device to be easily removed without incurring damage to the communication device. If a belt clip is desired to be attached directly to the communication device, without the use of a holster, prior communication devices utilize features or slots in the battery housing of the communication device to receive the attach mechanism of the belt clip. However, some prior belt clips have a tendency to suffer from mechanical reliability problems, particularly when used in the removal of a communication device from a user. For example, when a belt clip is pulled in a direction away from the communication device with extreme force, the belt clip has a tendency to detach from the communication device in a way that causes damage to the housing of the device.

Another problem with some prior belt clips is that a tool is needed to remove the belt clip from the communication device. The tool most commonly used is a flat blade screwdriver, which might be used to release more conventional cantilever sliding mechanisms. However, the additional tool may also accidentally damage the surface of the device.

Moreover, prior holster or belt clip assembly with a relatively sturdy design required both of the user's hands for removal of the communication device from the holster or belt clip. One hand operation is preferable to leave the other hand free and available for other tasks or activities.

Therefore, a need exists for a detachable compact belt clip that functions as a holster to allow a communication device worn by a user to be easily removed in a one hand operation yet mechanically reliable enough to hold and release the communication device.

DETAILED DESCRIPTION OF THE PREFERRED EMBODIMENT

Figure 1:
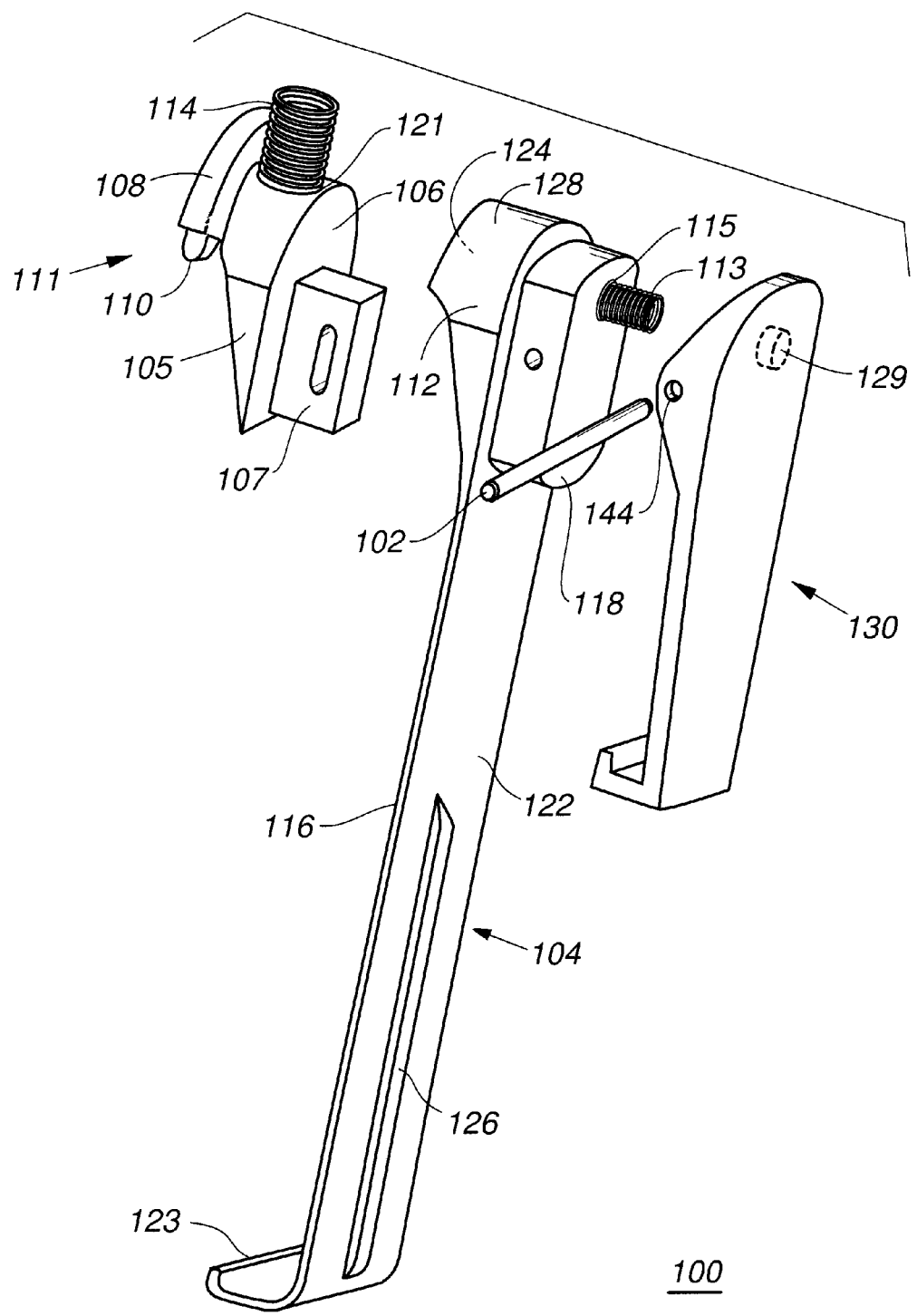
FIG. 1 is an exploded isometric view of a belt clip assembly 100 in accordance with the present invention.

Referring to FIGS. 1–5, taken in combination, there is shown a belt clip assembly 100 in conjunction with a communication device 103 in accordance with the present invention. More clearly seen in FIG. 1, the belt clip assembly 100 includes a pin 102, an attachment base 104, and a spring loaded or flexible cantilever slide 106 having a pair of spring loaded teeth 110 (also see FIG. 3). Two springs 113 and 114 are provided and preferably made of steel to give them the desired spring action. The attachment base 104 includes a bracket frame 116 having first 123 and second 124 opposed retaining ends. A hook 123 forms the first opposed retaining end. A receptacle 128, for receiving the spring loaded cantilever slide 106, forms the second opposed retaining end 124. In one illustrative example, the receptacle 128 can be formed by a slide casing wall 112 that has a "U" shaped center piece with tapering side-ends.

The base 104 is connected to a belt clip 130 via the pin 102. A raised portion of the base 104 forms a pedestal 118 for mounting the clip 130 which is used as a handle. The pin 102 is provided to allow for the pivotal movement of the clip 130 against the pedestal 118.

Figure 2:
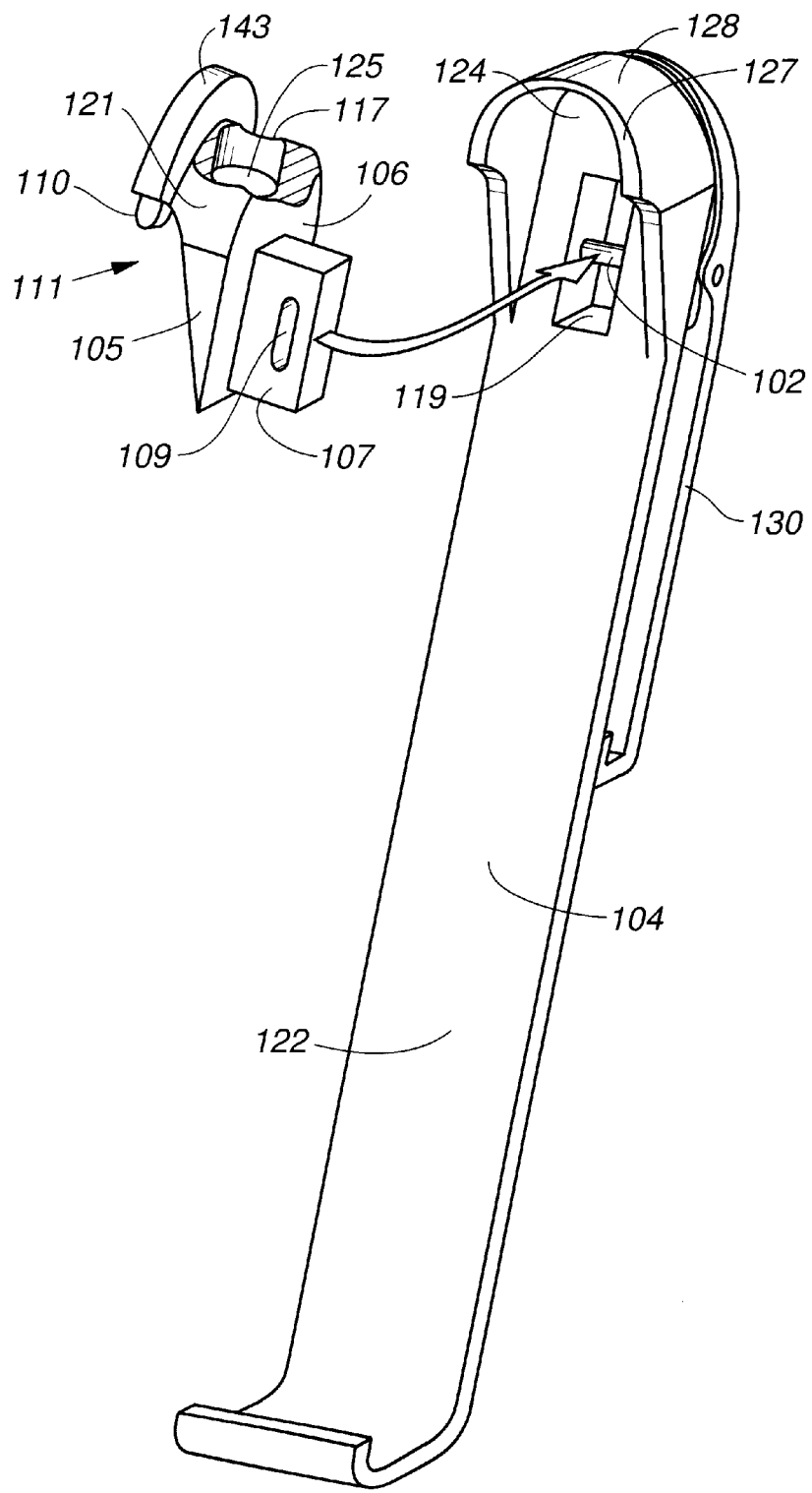
FIG. 2 is an exploded isometric view of a slide 106 for use as part of the belt clip assembly 100 of FIG. 1, in accordance with the present invention.

Referring to FIG. 2, the pin 102 passes through a bore or groove 119 of the pedestal (see 118 of FIG. 1) with the clip 130 rotatably mounted to the attachment base 104 by the pin 102 inserted through a pair of pin openings (see 144 of FIG. 1) of the two opposed sidewalls of the clip 130.

Figure 3:
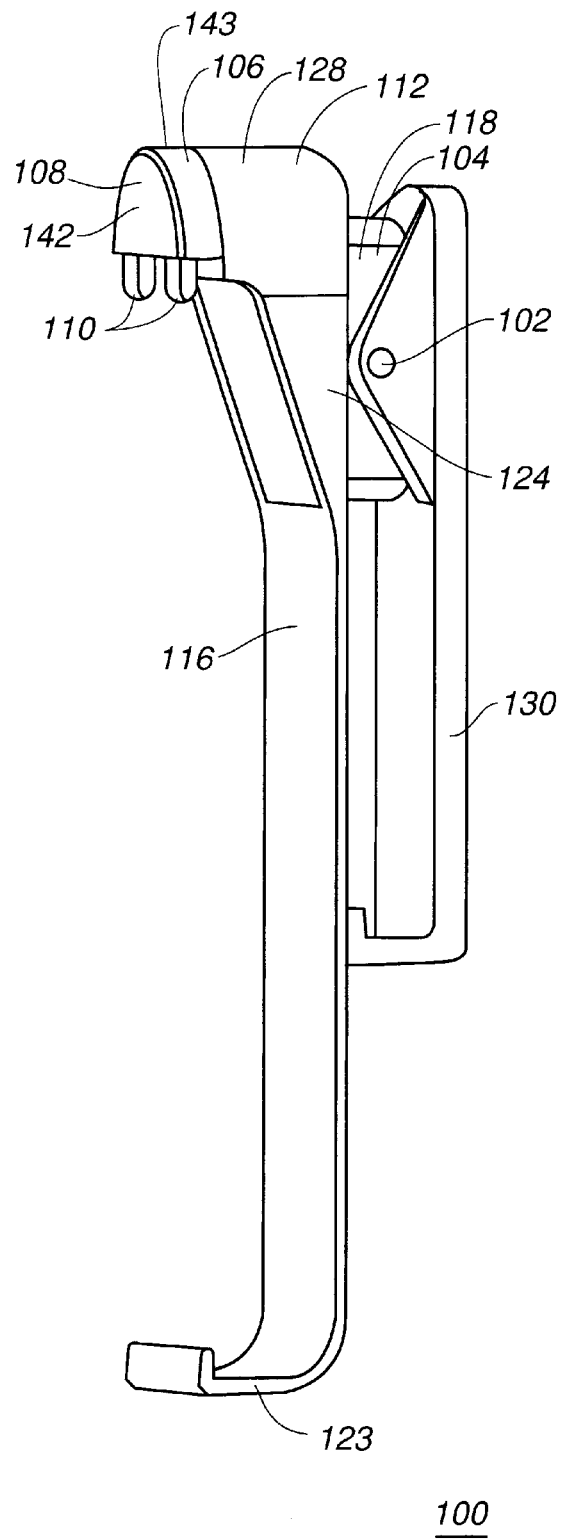
FIG. 3 is a side perspective view of the belt clip assembly 100 of FIG. 1, in accordance with the present invention.

Referring to FIG. 3, the pin 102 such inserted allows a user to pull the clip 130 away from the pedestal 118 to detach the clip from the user's clothing. Alternatively, the user releases the clip 130 to pivot it along the pin's 102 longitudinal axis against the pedestal 118 to attach the clip to the user's clothing. Referring back to FIG. 1, a first spring 113 that is captured by a pair of corresponding recesses 115 and 129 on the pedestal 118 and on the underside of the clip 130, respectively, provides a tension force on the belt clip assembly 100 in a direction towards a communication device housing (see 101 of FIG. 4) or towards the bracket 116.

In accordance with the present invention, the cantilevered bracket 116 is preferably slim in thickness and in width to minimize the size of the bracket while maximizing the strength of the bracket. For easy one-hand reliable attachment and removal, the bottom beam surface of the slim cantilevered bracket 116, in the form of a slim strip 122, preferably follows the mid-longitudinal surface of the communication device housing (see 101 of FIG. 4) to better retain the communication device (see 103 of FIG. 4) without taking-up too much space. Optionally the material of the bracket 116 may be resilient to allow more flexibility in the bracket 116 and bring even more comfort to the wearer of the belt clip assembly 100. However, using a non-resilient bracket material, even with an optional stiffening rib 126 shown in FIG. 1 only, can still provide sufficient flexibility due to the inventive spring loaded cantilever slide 106 slidably received in the receptacle 128 of the bracket 116.

Referring to FIG. 2, a better understanding of the slide arrangement of the present invention can be seen. Aside from the second spring (see 114 of FIG. 1) and the pair of spring loaded teeth 110, the spring loaded cantilever slide 106 includes a receptacle front cover 111 acting as a foundation for integrally mounting the pair of spring loaded teeth to the cover 111. On the cover's underside, a protruding member 107 is integrally connected to the cover 111.

The underside of the pedestal (see 118 of FIG. 1) of the bracket 116 is hollowed-out to form the groove 119. The groove 119 is sized larger than the member 107 for allowing the member 107 to slide within the groove 119. Since the pin 102 is inserted through the side-walls of the groove 119, the member 107 of the slide 106 preferably has an elongated aperture 109 for retainment by the pin 102, such that the member 107, acting as a tongue, can slide within the tongue and groove coupling. The elongated aperture 109 is sized longer than the pin 102 for the aperture to be retained by the pin 102, yet provide vertical movement to the member 107 within the groove 119. For simplicity in design, the pedestal 118 is substantially rectangular in shape. Hence, the groove 119 and corresponding elongated aperture 109 and member 107 are all substantially rectangular. However, since the pin 102 is rounded the elongated aperture 109 preferably also has a rounded top and bottom edge.

Optionally, the member 107 may be cut-way at the side facing the pin 102 to form an unclosed loop in the shape of a "C", as long as the aperture 109 can still be retained by the pin 102.

In accordance with the teachings of the invention, the receptacle end 124 of the bracket 116, along with the teeth 110 of the cover 111, form a second retaining end 124 of the bracket, conforming to the shape of a top portion of the communication device housing such that this receptacle end, with the cover pinned, can grasp the top of the device. Because the top surface of the communication device's housing 101 and a battery housing that is attached to the back of the communication device housing 101 are both angled or tapered to provide reduced thickness at the top, the receptacle cover 111 having to both accommodate this angled shape of the battery and communication device housings and the vertical movement of the member 107, is substantially in the shape of a triangle 105, like the shape of a cheese wedge or a door-stop to cover the opening of the receptacle 128. The thickest part of the wedge extends out to form a slightly curved end-wall 121. This end-wall 121 has an aperture which is bounded by the thickest edge of the wedge to form a recessed channel 117 for receiving the second spring (see 114 of FIG. 1). As the bottom of the aperture or recessed channel 117, the thickest edge of the wedge, acting as a cam 125, presses the second spring against the correspondingly shaped to the receptacle underside (see 127 of FIG. 2) of the bracket 116 to provide the spring action for the teeth 110 that are integrally connected to and are part of the cover 111.

Referring to FIG. 3, a fulcrum 108, in the shape of an almost half-circle 142, is integrally mounted to the pair of spring loaded teeth 110 in an arrangement similar to the shape of a viper head with two protruding fangs. From the side-view of FIG. 2, the head is horizontally and integrally connected to the slightly curved end-wall 121, at the diagonal edge of the half-circle to form an "S" shape. The top of the "S" would be formed by the overhang 143 of the fulcrum while the stepped-down protrusion member 107 would form the bottom of the "S". When the second spring (see 114 of FIG. 1) is uncompressed, the top of the half-circle fulcrum head 108 is in-lined with and covers almost seamlessly the top of the receptacle 128 and does not project out from the receptacle 128. However, when the second spring is compressed, the top of the half-circle fulcrum head 143 does project out, overhang, or otherwise extend vertically away from the top of receptacle 128.

Figure 4:
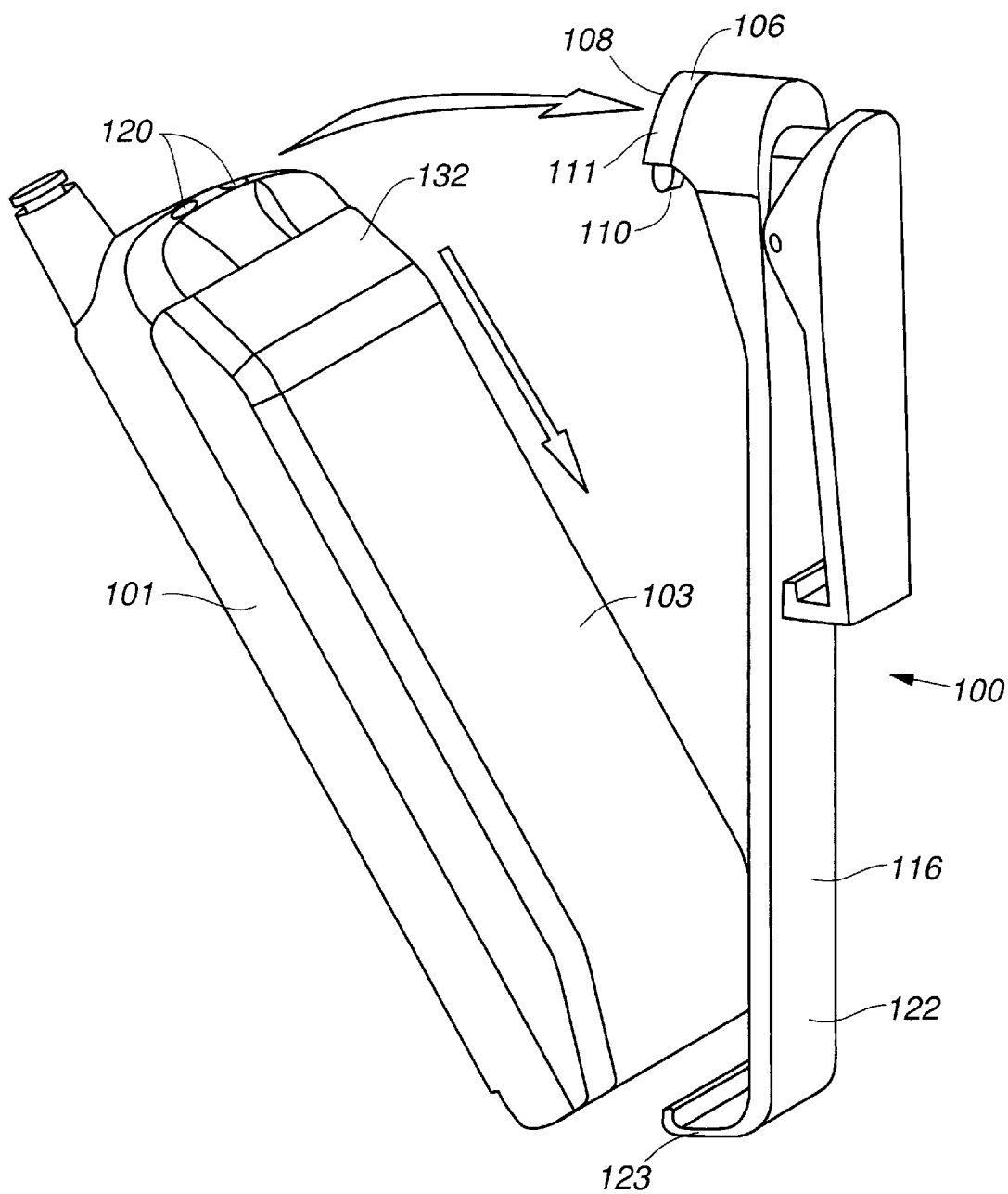
FIG. 4 is a side perspective view of the attachment process of the belt clip assembly 100 of FIG. 1 to a communication device, in accordance with the present invention.

Referring to FIG. 4, the belt clip assembly 100 is preferably attached to two slots 120 of the top surface of the communication device's housing 101 which receive the fulcrum (108) supported teeth 110. The slots 120 were originally provided on the communication device's housing 101 for coupling to a vehicular adapter. The dimensions of the pair of slots 120 are commensurate with the dimensions of the fulcrum (108) supported teeth 110 so that the teeth 110 can mate with the pair of slots 120. Preferably, the teeth 110 are slightly slanted and curved to provide a smoother entry into the corresponding slots 120 of the communication device housing 101. The pair of teeth or tabs 110 which extend out from the integrally connected fulcrum 108 thus locks the belt clip assembly 100 to the communication device 103 much like the viper's hold with its fangs.

Since the belt clip assembly 100 is purposely designed to be slim to minimize discomfort to the wearer, the belt clip assembly can be left clipped on the user's clothing, with or without the communication device 103. To attach the belt clip assembly 100 to the communication device housing 101 when the belt clip assembly is already clipped to the wearer, the user, in a simple one-hand operation, first pushes the communication device 103, already attached to a battery housing 132, against the hook of the first opposed retaining end 123 of the bracket 116 until the hook catches a recessed ledge of the communication housing. With the hook end 123 stationary and attached, the user pivots the communication device 103 inwardly until the top of the communication device housing 101 forces the cover 111 of the slide 106 to travel up momentarily to make room for the communication device (101) and battery (132) housings underneath until the fulcrum 108 supported teeth 110 of the cover snap into the mating pair of slots 120 of the communication device housing 101.

If the belt clip assembly 100 was not already attached to the wearer or it was desired to attach the belt clip assembly to the communication device 103 from the top down, a reverse in snapping sequence is also possible. Since the distance between the hook 123 of the first retaining end of the bracket 116 and the fulcrum (108) end, without tension applied from the uncompressed second spring (see 114 of FIG. 1), is less than or about the longitudinal distance of the communication device housing 101, there is a force from the fulcrum 108 acting against the pair of teeth inserted slots 120, on one end, which requires the user to extend the bracket 116 of the belt clip assembly 100 by pulling away from the spring loaded cantilever slide 106 until the retaining hook end 123, on the other end of the bracket 116 snaps onto the bottom portion or under the recessed edge of the communication device housing 101. This cantilevered condition along with the ramping features of the slanted and curved teeth 110 provide for a smooth one-hand assembly action that does not require any tool. A further advantage of the belt clip assembly 100 of the present invention is that the retention force provided is strong enough that a communication device 103 attached and flipped upside down can still be retained by the belt clip assembly 100 and not fall out of the bracket 116.

Figure 5:
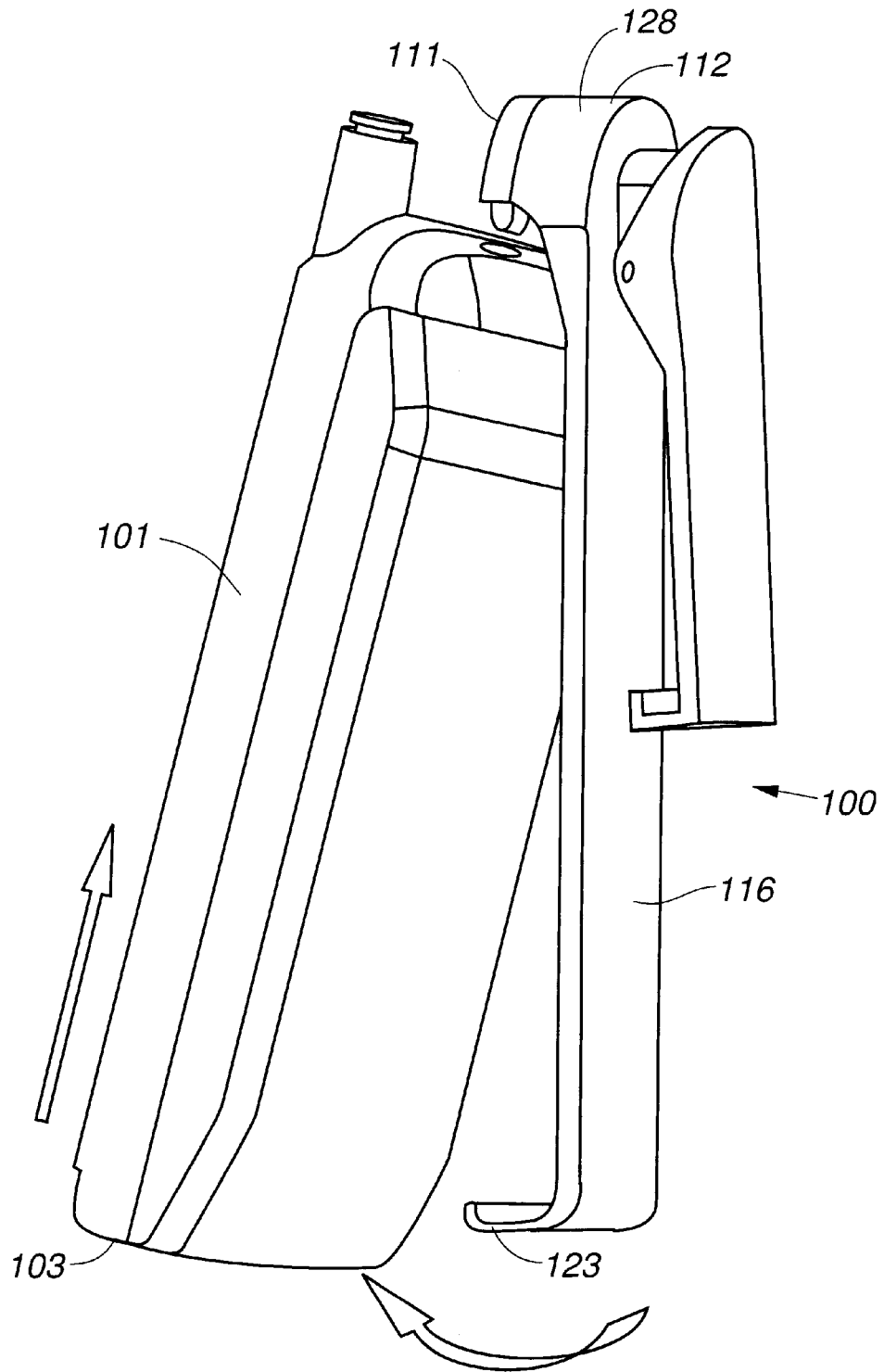
FIG. 5 is a side perspective view of the detachment process of the belt clip assembly 100 of FIG. 4 to the communication device, in accordance with the present invention.

Referring to FIG. 5, the detachment process is shown. For removal of the communication device 103 when the belt clip assembly 100 is desired to stay clipped on the wearer, the communication device 103 is first lifted-up by the user, in a one hand simple operation, to slide the cover 111 away from the receptacle 128, in order to allow room for the bottom portion of the communication device 103 to be pivoted out. After the bottom portion of the device 103 pivots out, the top of the housing can be released from the teeth 110 just by sliding the device 103 downward and away from the teeth 110. Specifically, the user can simply wrap his or her hand around the communication device 103 and extend the bracket 116 by sliding the device against the cover 111 upwardly, until the cover 111 is above and away from the slide casing wall 112 while the device 103 is still attached to the teeth 110 by the pair of slots 120. At this farthest extension of the bracket 116, the user unhooks the belt clip assembly 100 from the communication device housing 101 at the retaining end 123 and releases the device 103 with the pair of slots 120 away from the teeth 110.

When removal of the belt clip assembly 100 from the communication device housing 101 is desired and the belt clip assembly 100 is not clipped to the user, the device 103 can first be unhooked at the hook end 123 of the belt clip assembly and then the device 103 pivoted-out and released from the teeth 110 of the bracket 116 or the belt clip assembly 100 itself can be lifted up to move the teeth 110 away from the device's slots 120.

In essence and referring to FIGS. 1–5, the pedestal 118 of the base 104 is integral with the bracket 116 having a first retaining hook end 123 and a second retaining receptacle end 124. Opposed retaining ends 123 and 124 of the bracket 116 ensure that the bracket and a flexible cantilever slide 106 contained within, remains stationary. The receptacle end 124 is shaped to accept the correspondingly shaped cantilever slide 106. The slide 106 includes a fulcrum head 108 extended by a pair of teeth 110 to form a slidable and spring-loaded cover 111 for the second retaining end 124. The cantilever slide 106 has a protruding member 107 on the underside of the cover 111 to fit within a corresponding groove 119 of the pedestal 118. Once hooked on the hook end 123, the pair of teeth 110 of the flexible cantilever slide 106 lock the belt clip assembly 100 within the pair of corresponding slots 120 of the communication housing, on the receptacle end 124. Advantageously, the belt clip assembly 100 of the present invention provides the user with a simple one-hand attachment and detachment of the communication device 103 to an already attached belt clip assembly, without the aid of a tool. The attachment of the belt clip assembly 100 to the communication device 101 can be done in one hand by sliding a pair of spring and fulcrum supported teeth 110 into a mating pair of slots 120. Once attached, two retaining ends of the communication device 103 conforming bracket 116 both act to prohibit the mobility of the device.

What is claimed is:

1. A belt clip assembly comprising:
   an attachment base including a bracket having first and second opposed retaining ends, the first opposed retaining end having a hook; the second opposed retaining end having a receptacle for receiving the spring loaded slide; and
   a spring loaded slide having a pair of spring loaded teeth, a spring, a member slidably positioned within the receptacle, the pair of spring loaded teeth integrally connected to the member by a receptacle cover and the receptacle cover having a recessed channel for receiving the spring and pressing the spring against the receptacle.

2. The belt clip assembly of claim 1, further comprising:
   a pin for retaining the member within the receptacle; and
   a belt clip rotatably mounted to the attachment base by the pin.

3. The belt clip assembly of claim 2, wherein the receptacle comprises a rectangular groove having side-walls, the pin inserted through the side-walls of the rectangular groove.

4. The belt clip assembly of claim 3, wherein the member comprises a rectangular tongue sized smaller than the rectangular groove such that the rectangular tongue can slide within the rectangular groove.

5. The belt clip assembly of claim 4, wherein the rectangular tongue includes an elongated aperture for receiving the pin through the elongated aperture and for slidably tongue and groove attaching the rectangular tongue to the base.

6. A belt clip mount assembly comprising:
   an attachment base including a bracket having first and second opposed retaining ends,
      the first opposed retaining end having a hook, and
      the second opposed retaining end having a receptacle;
   a spring loaded cantilever slide for slidably positioning within the receptacle;
      the spring loaded cantilever slide including:
         a spring; and
         a member slidably positioned within the receptacle;
         a pair of spring loaded teeth integrally connected to the member by a receptacle cover; and
            the receptacle cover having a recessed channel for receiving the spring and pressing the spring against the receptacle; and
   a pin for retaining the member within the receptacle.

7. A communication device, comprising:
   a communication device housing including a pair of slots;
      a first opposed housing portion; and
      a second opposed housing portion; and
   a belt clip assembly coupled to the communication device housing, the belt clip assembly including:
      an attachment base; and
      a spring loaded cantilever slide having a pair of spring loaded teeth;
         the attachment base including a bracket having first and second opposed retaining ends,
         the first opposed retaining end having a first hook for wrapping around the first opposed housing portion; and
         the second opposed retaining end having a receptacle for receiving the spring loaded cantilever slide for forming a second hook for wrapping the second opposed retaining end around the second opposed housing portion and for slidably engaging the pair of teeth into the pair of slots of the communication device housing for preventing disengagement of the belt clip from the communication device.

8. The communication device of claim 7, wherein the communication device housing comprises a radio housing.

9. The communication device of claim 7, wherein the communication device housing comprises a combined radio, phone, and pager housing.

* * * * *